United States Patent [19]

Madgavkar et al.

[11] Patent Number: 5,104,972
[45] Date of Patent: Apr. 14, 1992

[54] REMOVAL OF HYDROGENATION CATALYST FROM POLYMER SOLUTIONS BY CONTACT WITH SILICATES

[75] Inventors: Ajay M. Madgavkar, Edwardsville, Ill.; Carma J. Gibler, Houston; David W. Daum, Seabrook, both of Tex.

[73] Assignee: Shell Oil Company, Houston, Tex.

[21] Appl. No.: 617,224

[22] Filed: Nov. 23, 1990

[51] Int. Cl.$^5$ ................................................ C08F 6/08
[52] U.S. Cl. .................................... 528/488; 523/310; 528/490
[58] Field of Search .................. 523/310; 528/488, 490

[56] References Cited

U.S. PATENT DOCUMENTS

| | | | |
|---|---|---|---|
| 2,935,499 | 5/1960 | Albright et al. | 528/490 |
| 3,554,991 | 1/1971 | Griffith | 260/88.7 |
| 3,780,137 | 12/1973 | Hassell | 528/483 |
| 3,793,307 | 2/1974 | DeVault | 528/483 |
| 4,028,485 | 6/1977 | Poloso et al. | 528/486 |
| 4,098,991 | 7/1978 | Kang | 528/492 |
| 4,278,506 | 7/1981 | Irvin | 203/68 |
| 4,471,099 | 9/1984 | Trepka | 525/338 |
| 4,595,749 | 6/1986 | Hoxmeier | 528/483 |

*Primary Examiner*—Paul R. Michl
*Assistant Examiner*—John J. Guarriello

[57] ABSTRACT

A process is provided comprising the steps of contacting a Group VIII metal hydrogenation catalyst residue containing polymer solution with a silicate, and recovering a polymer solution comprising less than 5 ppm by weight, based on the solution, of the Group VIII metal. In a preferred embodiment, the silicate is calcium silicate, magnesium silicate or diatomaceous earth.

33 Claims, No Drawings

REMOVAL OF HYDROGENATION CATALYST FROM POLYMER SOLUTIONS BY CONTACT WITH SILICATES

FIELD OF THE INVENTION

This invention relates to a process to prepare hydrogenated polymers. More particularly, the invention relates to the removal of residues of Group VIII metal containing hydrogenation catalysts from polymer solutions.

BACKGROUND OF THE INVENTION

The uses of polymeric materials, including diolefin polymers, continue to grow rapidly in such diverse areas as protective paint coverings, wire insulations, structural panels for automobiles, piping and lubricating oil viscosity index improvers. In many of these applications, the stability of the polymer is of paramount importance. Hydrogenation of diolefin polymers greatly improves the stability of these polymers against oxidative, thermal, and ultra violet degradation. Polymer hydrogenation processes have therefore been studied for many years as a method to prepare novel materials with excellent stability and other desirable properties. Early polymer hydrogenation processes utilized heterogeneous catalysts which were known to be useful for hydrogenation of low molecular weight olefins and aromatics. These catalyst systems included catalysts such as nickel on kieselguhr. A fine catalyst powder was preferred and large amounts of catalysts were required to complete the hydrogenation in a reasonable time. Such processes were only partially successful, since the reaction requires the diffusion of the polymer molecules into the pores of the catalyst, where the active nickel metal is present. This is a slow process when hydrogenating polymers.

Discovery of nickel octoate/triethyl aluminum hydrogenation catalyst systems enabled rapid hydrogenation of polymers. These processes utilize the catalyst as a colloidal suspension in polymer containing solutions. This type of catalyst is referred to as a homogeneous catalyst. Such a process has been used for a number of years to prepare hydrogenated butadiene-styrene polymers that are used as viscosity index improvers in premium motor oils. U.S. Pat. No. 3,554,991 describes an exemplary process. Besides nickel, Group VIII metals in general will function as the active metal in these systems, and in particular, iron, cobalt, and palladium are known to be acceptable.

Pore diffusion is not a limitation when homogeneous catalysts are utilized. The hydrogenation process is rapid and complete in a matter of minutes. However, removal of the catalyst from the polymer product is necessary because metals, particularly nickel, which remain with the polymer catalyze degradation of the polymer product. The removal of the catalyst from the polymer solution is commonly accomplished by the addition of an ammonium phosphate-water solution and air, which oxidizes the nickel to a divalent state. The mixed nickel-aluminum phosphate can then be removed from the hydrogenated polymer solution by filtration.

Alternative methods to remove hydrogenation catalyst residues from solutions of hydrogenated polymers include treatment with dicarboxylic acid and an oxidant, as disclosed in U.S. Pat. No. 4,595,749; treatment with an amine compound wherein the amine is either a chloride salt or a diamine having an alkyl group of 1 to 12 carbon atoms as disclosed by U.S. Pat. No. 4,098,991; and treatment with a non-aqueous acid followed by neutralization with an anhydrous base and filtration, as disclosed by U.S. Pat. No. 4,028,485. These processes involve contacting the polymer solution with compounds which contaminate the polymer. Further process steps can be required to remove these contaminants. U.S. Pat. Nos. 4,278,506 and 4,471,099 describe processes to remove such contaminants from hydrogenated polymer solutions. Some of these catalyst removal systems are undesirable because those processes require relatively expensive metallurgy due to the corrosive nature of the compounds. Many also require the consumption of a continuous stream of reactants, and produce a sludge containing the catalyst and residues of the treatment chemicals.

It is therefore an object of this invention to provide a process to remove Group VIII metal hydrogenation catalyst residue from polymer solutions. It is a further object of this invention to provide a process to remove hydrogenation catalyst residue from polymer solutions which does not require the treatment of the polymer solution with phosphate compounds. In another aspect, it is an object of this invention to provide a process which is capable of removing catalyst residue from polymer solutions to a level of 5 ppm or less of Group VIII metal based on the solution. It is a further object to provide such a process which does not introduce a soluble contaminant into the polymer solution.

SUMMARY OF THE INVENTION

The objects of this invention are accomplished by a process comprising the steps of contacting a Group VIII metal hydrogenation catalyst residue containing polymer solution with a silicate and recovering a polymer solution comprising less than 5 ppm by weight, based on the solution, of the Group VIII metal. In a preferred embodiment, the silicate is a calcium or magnesium silicate or diatomaceous earth. Cocatalysts, such as aluminum, are also removed by this process. Being a physically separable solid, the silicates of the present invention do not contaminate the polymer or require an additional purification step in the polymer production process other than a physical separation of solids from the solution.

DETAILED DESCRIPTION OF THE INVENTION

A wide variety of silicates is useful as the adsorbent of the present invention. Useful silicates include synthetic and natural silicates. The silicates must be insoluble in the solvent utilized, but could be water soluble.

Acceptable naturally occurring silicates include diatomaceous earth, beryl, asbestos, talc, feldspar, vermiculite and mica. Acceptable synthetic silicates include zeolites and waterglass. Useful soluble silicates include sodium metasilicate, sodium metasilicate pentahydrate, sodium sequisilicate and sodium orthosilicate.

Some useful silicates may be represented by the general formula:

$$M_2O \cdot mSiO_2 \cdot nH_2O$$

wherein M is an alkali metal, and m and n are real numbers. Alkali metals include lithium, sodium, potassium, rubidium, bidium, cesium and francium. The ratio of $SiO_2$ to $M_2O$ typically varies from 0.33 to 9.0.

Useful zeolites may be represented by the general formula:

$$M_{x/n}[(AlO_2)_x(SiO_2)_y] \cdot zH_2O$$

wherein M is either an alkali metal or an alkaline earth metal, and x, y and z are real numbers.

Metal ions such as $Cu^{+2}$, $Fe^{+3}$, $Cd^{+2}$, $Pd^{+2}$, $Ca^{+2}$ and $Mg^{+2}$ may be substituted for the alkali metal in the silica of this invention, in whole or in part.

Silicates which also include oxides of Group IIA metals, such as calcium and magnesium silicates, are also useful in the present invention. Those compounds are of the general formula: $MSiO_3$ where M is a Group IIA metal. The silicates may also be a combination of the above silicates, or mixtures of one or more with other compounds.

The silicates are preferably in a powder or small bead form. Preferably average diameters are those less than about 0.5 mm. Large diameter pellets of silicates may be utilized, but due to the limited effective surface area of the large pellets more adsorbent is required. Diatomaceous earth is a particularly preferred silicate containing compound because diatomacious earth has a very large effective surface area, but is of a large enough particle size to be conveniently separated from the solution.

Particles of average particle diameters of less than 0.5 mm can generally be loaded with 4 percent by weight of the Group VIII metal compound. The amount of adsorbent must therefore be greater than 25 times the amount of Group VIII metal to be absorbed, and is preferably greater than 500 times the amount of Group VIII metal to be adsorbed.

The residence time required to accomplish a sufficient adsorption of the Group VIII metal varies, but generally about 120 minutes is sufficient. Increasing the amount of adsorbent can decrease the required contact time, as can dilution of the solution with a solvent such as cyclohexane, and increasing the temperature of the solution during contacting with the adsorbent. Adding diluent and increasing temperature are believed to be effective in reducing the required amount of adsorbent due to decreasing the viscosity of the polymer solution.

The polymer solutions of the present invention preferably comprise from 1 to about 40 percent by weight of a polymer, and more preferably comprise from about 2 to about 20 percent by weight of polymer based on the total amount of solution. The polymer is a partially, selectively, or totally hydrogenated polymer. The present invention does not depend upon the type or nature of the polymer. The polymer may therefore be a thermoplastic polymer, or an elastomeric polymer and may have a molecular weight which varies between wide limits. Most typically, polymers which are benefited by hydrogenation are those comprising polymerized conjugated diolefins. These conjugated diolefin containing polymers are therefore preferred for the practice of the present invention. They may be prepared by radical, anionic or cationic polymerization and may be copolymers with other monomer units. The copolymers may be random, block, or tapered, and may have structures that are linear, branched, radial, or star.

In a most preferred embodiment, the polymer is an anionically polymerized conjugated diolefin polymer which was anionically polymerized in an inert solvent, and then hydrogenated in the same solvent to form the hydrogenation catalyst residue containing polymer solution.

When an anionic initiator is used, polymers will be prepared by contacting the monomers with an organoalkali metal compound in a suitable solvent at a temperature within the range from about $-100°$ C. to about 300°, preferably at a temperature within the range from about 0° C. to about 100° C. Particularly effective polymerization initiators are organolithium compounds having the general formula:

$$RLi_n$$

Wherein:
R is an aliphatic, cycloaliphatic or aromatic hydrocarbon radical having from one to about 20 carbon atoms; and n is an integer from 1 to 4.

When the polymer is a block copolymer, the copolymer is preferably a styrene-conjugated diolefin block copolymer. This is due to the thermoplastic and elastomeric nature of these polymers. The polystyrene, being incompatible with the poly(conjugated olefins), form separate domains, and these domains have relatively high glass transition temperatures. Above the glass transition temperatures of the polystyrene domains the polymer is in a melt and can be molded, extruded or blended with other components. Below the glass transition temperature of the polystyrene, the hard polystyrene domains act as physical crosslinks between the rubbery polyconjugated diolefin chains. This results in excellent elastomer properties.

The polymer of the present invention is contacted with hydrogenation catalyst and hydrogen in a solution with an inert solvent such as cyclohexane, normal hexane, diethyl ether, toluene or benzene. The hydrogenation catalysts themselves have complex structures which are not well understood and are therefore usually described by the process used to prepare them. The hydrogenation catalyst can be prepared by combining a Group VIII metal carboxylate or alkoxide ("catalyst") with an alkyl or hydride of a metal selected from Groups I-A, II-A and III-B of Medeleev's Periodic Table of Elements ("co-catalyst"). The preparation of such catalysts is taught in U.S. Pat. Nos. 3,591,064 and 4,028,485, which are incorporated herein by reference.

Typically, between about 0.09 and about 10 mmoles of Group VIII metal is utilized per 100 g of polymer to be hydrogenated. This corresponds to about 0.1 to 13 mmoles of Group VIII metal per liter of solution.

The catalyst metals which are preferred include iron, cobalt, nickel and palladium. Nickel and cobalt are particularly preferred. Iron is not particularly preferred because it is less active than the others, and palladium is not particularly preferred because it is more expensive than nickel and cobalt. Lithium, magnesium and aluminum are preferred cocatalysts due to the excellent activity of the catalyst-cocatalyst systems which comprise those cocatalysts.

The hydrogenation catalysts are insoluble in the polymer solutions, and form a colloidal suspension.

The hydrogenation catalyst residue containing polymer solution may be contacted with the silicate either in a continuous process or in a batch process. The silicate may be in a fixed bed with the polymer solution passing through the fixed bed, or the silicate may be in a moving bed, ebulated bed or a fluidized bed. The silicate may alternatively be agitated with the polymer solution and then separated. If the silicate is agitated and then separated from the polymer solution, the silicate and polymer solution could be contacted in two or more stages.

Preferably, the stages will be counter current, resulting in maximum loading of the adsorbent and minimal metal content of the treated solutions. Typical fixed bed systems are not preferred because pellets which are sufficiently large to result in an acceptably low pressure drop do not have enough surface area to be efficient in adsorbing metal ions from these polymer systems. Alternatively, when the fixed bed system is designed for the pressure drop, the size of fixed bed is large.

When the silicate and the polymer solution are combined and agitated, the treated polymer solution may be recovered by any known means to separate solids from viscous liquids. Centrifugal means such as centrifuges or cyclones may be utilized. Filtering, preferably in the presence of a filter aid may also be utilized, along with gravity settlement such as decantation, or sedimentation in parallel plate separators. Filtering utilizing a filter aid is preferred because this method is known to be effective to separate fine particles from polymer solutions.

An oxidation agent, such as molecular oxygen or a peroxide, may optionally be present when the polymer solution is contacted with the silicate. Oxidation agents increase the valence of the hydrogenation catalyst metals which, under some circumstances, may enhance the adsorption of the catalyst particles.

The process of this invention is also effective in reducing the level of aluminum hydrogenation cocatalysts in the polymer solutions.

EXAMPLE 1

To determine if certain known adsorbents are effective in removing Group VIII metals from polymer cements, a number of adsorbents were mixed with solutions containing hydrogenation catalysts and then the amount of Group VIII metal remaining in the solution was determined.

The polymer solutions utilized were:

Solution A: This solution was a 16 percent by weight solution of a hydrogenated S—B—S triblock copolymer having a 29% by weight styrene content and about a 52,000 molecular weight in cyclohexane.

Solution B: This solution was 5 percent by weight solution of hydrogenated isoprene in cyclohexane.

The absorbents used were:

Adsorbent 1—Micro-Cel T-49; a calcium silicate adsorbent which is in the form of a powder and is available from Manville Chemical Corporation.

Adsorbent 2—Silasorb; a calcium silicate adsorbent which is a powder and is available from Manville Chemical Corporation.

Adsorbent 3—R-680; a calcium silicate available from Manville Chemical Corporation.

Adsorbent 4—R-685; a magnesium silicate available from Manville Chemical Corporation.

Adsorbent 5—Celite 512; a diatomaceous earth available from Manville Chemical Corporation.

Adsorbent 6—Celite 545; a diatomaceous earth available from Manville Chemical Corporation.

Adsorbent 7—Celite AF-11; a diatomaceous earth available from Manville Chemical Corporation.

Adsorbent 8—Hyflow Super Cel; a diatomaceous earth available from Manville Chemical Corporation.

Adsorbent 9—K-Sorb; a dibasic magnesium phosphate available from Manville Chemical Corporation.

Adsorbent 10—Reillex 425; a 18 to 50 mesh adsorbent available from Reilly Tar & Chemical.

The adsorbents were placed in a jar with the solutions and nickel 2-ethyl-1-hexanoate/triethylaluminum hydrogenation catalyst. The jars were then rolled to provide agitation. The mixtures were then allowed to settle overnight and the solution phases were then sampled and tested for nickel. The aluminum contents of solution phases were also determined for some samples.

Additional cyclohexane was added to some samples before the jars were rolled to determine the effect of solution viscosity/polymer concentration on the adsorption. Varying amounts of adsorbent were added to determine minimum adsorbent concentration, and the maximum nickel adsorption per gram of adsorbent. The contact time between the adsorbent and solution containing the nickel was also varied to show that the time to reach equilibrium nickel adsorptions is relatively short at 2 hours.

The nickel contents of the treated solutions are listed below in Table 1 along with the type of adsorbent, amount of adsorbent, wt % of adsorbent based on the total amount of solution, amount of polymer solution, initial concentrations of nickel and aluminum after cyclohexane addition, treated solution aluminum content (if determined), contact time, weight ratio of nickel to adsorbent and the amount of additional cyclohexane added.

TABLE 1

| Sample | Adsorbent Type | Adsorbent Amount gm | Adsorbent Amount % wt | Solution Type | Solution Amount gm | Cyclohexane gm | Time | Initial Concentration Ni (ppm) | Initial Concentration Al (ppm) | $\frac{Ni/Ad.}{Wt. Ratio} \times 10^3$ | Treated Solution Ni (ppm) | Treated Solution Al (ppm) |
|---|---|---|---|---|---|---|---|---|---|---|---|---|
| 1  | 1 | 3.0  | 10.0 | A | 30  | 0  | 3 days | 86  | —   | 0.86  | 0.3  | —   |
| 2  | 1 | 3.0  | 10.0 | B | 30  | 0  | 3 days | 311 | 165 | 3.11  | 0.4  | 0.3 |
| 3  | 1 | 1.0  | 2.0  | A | 25  | 25 | 3 days | 47  | 57  | 2.35  | 0.3  | 1.6 |
| 4  | 1 | 0.33 | 0.67 | A | 25  | 25 | 3 days | 47  | 57  | 7.05  | 0.7  | 2.2 |
| 5  | 1 | 0.67 | 0.67 | B | 100 | 0  | 3 days | 298 | —   | 89.4  | 254  | —   |
| 6  | 1 | 0.2  | 0.2  | A | 50  | 50 | 3 days | 49  | —   | 24.5  | 4.7  | —   |
| 7  | 1 | 0.1  | 0.1  | A | 50  | 50 | 3 days | 49  | —   | 49    | 11.9 | —   |
| 8  | 1 | 2.0  | 2.0  | A | 50  | 50 | 2 hrs  | 51  | 48  | 2.55  | 0.4  | 1.4 |
| 9  | 1 | 0.67 | 0.67 | A | 50  | 50 | 2 hrs  | 51  | 48  | 7.65  | 2.4  | 4.2 |
| 10 | 2 | 3.0  | 10.0 | A | 30  | 0  | 3 days | 86  | —   | 0.86  | 0.2  | —   |
| 11 | 2 | 3.0  | 10.0 | B | 30  | 0  | 3 days | 311 | 165 | 3.11  | 0.4  | 0.6 |
| 12 | 2 | 1.0  | 2.0  | A | 25  | 25 | 3 days | 47  | 57  | 2.35  | 0.2  | 2.1 |
| 13 | 2 | 0.33 | 0.67 | A | 25  | 25 | 3 days | 47  | 57  | 7.05  | 1.4  | 3.2 |
| 14 | 2 | 0.1  | 0.1  | A | 50  | 50 | 3 days | 49  | —   | 49    | 13.0 | —   |
| 15 | 2 | 0.67 | 0.67 | B | 100 | 0  | 3 days | 298 | —   | 44.7  | 249  | —   |
| 16 | 2 | 0.2  | 0.2  | B | 100 | 0  | 3 days | 297 | —   | 148   | 288  | —   |
| 17 | 2 | 0.2  | 0.2  | A | 50  | 50 | 3 days | 49  | —   | 24.5  | 4.9  | —   |
| 18 | 2 | 0.67 | 0.67 | A | 50  | 50 | 2 hrs  | 51  | 48  | 7.65  | 2.3  | 3.8 |
| 19 | 2 | 2.0  | 2.0  | A | 50  | 50 | 2 hrs  | 51  | 48  | 2.55  | 0.6  | 2.4 |
| 20 | 3 | 3.0  | 10.0 | A | 30  | 0  | 3 days | 85  | —   | 0.85  | 0.2  | —   |

TABLE 1-continued

| Sample | Type | Adsorbent Amount gm | Amount % wt | Solution Type | Amount gm | Cyclohexane gm | Time | Initial Concentration Ni (ppm) | Al (ppm) | Ni/Ad. Wt. Ratio $\times 10^3$ | Treated Solution Ni (ppm) | Al (ppm) |
|---|---|---|---|---|---|---|---|---|---|---|---|---|
| 21 | 3 | 3.0 | 10.0 | B | 30 | 0 | 3 days | 311 | 165 | 3.11 | 0.3 | 0.3 |
| 22 | 3 | 0.67 | 0.67 | B | 100 | 0 | 3 days | 298 | — | 44.7 | 256 | — |
| 23 | 3 | 1.0 | 2.0 | A | 25 | 25 | 3 days | 47 | 57 | 2.35 | 0.4 | 1.7 |
| 24 | 3 | 0.33 | 0.67 | A | 25 | 25 | 3 days | 47 | 57 | 7.05 | 1.8 | 3.2 |
| 25 | 3 | 0.1 | 0.1 | A | 50 | 50 | 3 days | 49 | — | 49 | 19.5 | — |
| 26 | 3 | 0.2 | 0.2 | A | 50 | 50 | 3 days | 49 | — | 24.5 | 4.0 | — |
| 27 | 3 | 0.67 | 0.67 | A | 50 | 50 | 2 hrs | 51 | 48 | 7.65 | 2.7 | 4.0 |
| 28 | 3 | 2.0 | 2.0 | A | 50 | 50 | 2 hrs | 51 | 48 | 2.55 | 0.4 | 1.4 |
| 29 | 4 | 3.0 | 10.0 | A | 30 | 0 | 3 days | 85 | — | 0.85 | 0.3 | — |
| 30 | 4 | 3.0 | 10.0 | B | 30 | 0 | 3 days | 311 | 165 | 3.11 | 0.5 | 0.5 |
| 31 | 4 | 1.0 | 2.0 | A | 25 | 25 | 3 days | 47 | 57 | 2.35 | 0.3 | 1.5 |
| 32 | 4 | 0.33 | 0.67 | A | 25 | 25 | 3 days | 47 | 57 | 7.05 | 1.0 | 3.0 |
| 33 | 4 | 0.2 | 0.2 | A | 50 | 50 | 3 days | 49 | — | 24.5 | 4.8 | — |
| 34 | 4 | 0.1 | 0.1 | A | 50 | 50 | 3 days | 49 | — | 49 | 5.5 | — |
| 35 | 4 | 0.67 | 0.67 | B | 100 | 0 | 3 days | 298 | — | 89.4 | 263 | — |
| 36 | 4 | 0.67 | 0.67 | A | 50 | 50 | 2 hrs | 51 | 48 | 7.65 | 1.9 | 2.3 |
| 37 | 4 | 2.0 | 2.0 | A | 50 | 50 | 2 hrs | 51 | 48 | 2.55 | 0.3 | 0.6 |
| 38 | 5 | 5.0 | 10.0 | A | 25 | 25 | 3 days | 51 | 48 | 0.51 | 0.2 | 0.4 |
| 39 | 5 | 0.33 | 0.67 | A | 25 | 25 | 3 days | 51 | 48 | 7.65 | 2.2 | 2.8 |
| 40 | 6 | 5.0 | 10.0 | A | 25 | 25 | 3 days | 51 | 48 | 0.51 | 0.4 | 0.3 |
| 41 | 6 | 0.33 | 0.67 | A | 25 | 25 | 3 days | 51 | 48 | 7.65 | 11.2 | 12.3 |
| 42 | 7 | 5.0 | 10.0 | A | 25 | 25 | 3 days | 51 | 48 | 0.51 | 1.3 | 3.0 |
| 43 | 7 | 0.33 | 0.67 | A | 25 | 25 | 3 days | 51 | 48 | 7.65 | 14.2 | 17.9 |
| 44 | 8 | 5.0 | 10.0 | A | 25 | 25 | 3 days | 51 | 48 | 7.65 | 0.4 | 0.5 |
| 45 | 8 | 0.33 | 0.67 | A | 25 | 25 | 3 days | 51 | 48 | 7.65 | 8.4 | 9.3 |
| 46 | 9 | 3.0 | 10.0 | B | 30 | 0 | 3 days | 311 | 165 | 3.11 | 313 | 250 |
| 47 | 10 | 3.0 | 10.0 | B | 30 | 0 | 3 days | 311 | 165 | 3.11 | 318 | 128 |

The nickel contents of the treated polymer solutions indicate that the silicate based adsorbents, including diatomaceous earth, adsorb nickel/aluminum hydrogenation catalyst from polymer cements, resulting in treated polymer solutions with acceptably low Group VIII metal contents. Additionally, the mixing time required to remove the nickel and aluminum is less then 2 hours and the minimum adsorbent concentrations required is as low as from 0.2 to 0.7% wt. Samples 42 and 43 demonstrate that other metal ion adsorption mediums (K-Sorb and Reillex 425) do not function acceptably as hydrogenation catalyst adsorbents. Additionally, it can be seen from Table 1 that the weight ratio of nickel to adsorbent must generally be less than $25 \times 10^{-3}$ for the calcium and magnesium silicates, and about $5 \times 10^{-3}$ for most of the diatomaceous earths tested.

EXAMPLE 2

The residence time required to accomplish nickel removal with varying amounts of diatomaceous earth adsorbents was determined in this example. The polymer solution utilized in this example was an 8 percent by weight solution of a hydrogenated SBS triblock copolymer having 29 percent by weight styrene and a weight average molecular weight of about 52,000. Sufficient nickel 2-ethyl-1-hexonoate/triethylaluminum hydrogenation catalyst was added to the polymer solution to result in a 53 ppm nickel content. About 50 grams of the adsorbents were added to jars containing the polymer solutions in the amounts listed on Table 2, and the jars were rolled for either 30 minutes or 120 minutes. The solutions were then separated from the adsorbent by decanting clear solution after the solids were allowed to settle. Celite 512 (Adsorbent 5) and Celite 545 (Adsorbent 6) were used in three different amounts. Treated solution nickel contents were determined after one half hour and after two hours of mixing of the adsorbents and the nickel catalyst containing polymer cement.

Table 2 includes the conditions for each and the resulting treated solution nickel contents.

TABLE 2

| Sample | Adsorbent Type | Amount gm | Amount % wt | Mixing Time (min) | Treated Solution Ni (ppm) |
|---|---|---|---|---|---|
| 48 | 5 | 5 | 10.0 | 120 | 0.5 |
| 49 | 5 | 1 | 2.0 | 120 | 4.0 |
| 50 | 5 | 0.3 | 0.7 | 120 | 22.5 |
| 51 | 5 | 5 | 10.0 | 30 | 0.7 |
| 52 | 5 | 1 | 2.0 | 30 | 1.8 |
| 53 | 5 | 0.3 | 0.7 | 30 | 4.1 |
| 54 | 6 | 5 | 10.0 | 120 | 0.4 |
| 55 | 6 | 1 | 2.0 | 120 | 5.9 |
| 56 | 6 | 0.3 | 0.7 | 120 | 4.2 |
| 57 | 6 | 5 | 10.0 | 30 | 0.6 |
| 58 | 6 | 1 | 2.0 | 30 | 4.5 |
| 59 | 6 | 0.3 | 0.7 | 30 | 6.1 |

This example demonstrated that a 30 minute residence time is generally sufficient for the adsorption of nickel from polymer solutions.

EXAMPLE 3

This example demonstrated the effectiveness of silicates in adsorbing cobalt from cobalt containing hydrogenation catalyst containing solutions. A cobalt 2-ethyl-1-hexanoate/triethylaluminum catalyst was combined in cyclohexane to form a 41 ppm by weight cobalt mixture. Adsorbents 3 and 4 were then added to separate jars each containing 100 gm samples of the cobalt containing solutions. The adsorbents were added in amounts of 0.67 grams and the jars were rolled for 3 days. The jars were then set overnight. The solutions were clear and each contained less than 3 ppm of cobalt, based on the solution.

This example demonstrated the effectiveness of silicate in removing cobalt hydrogenation catalysts from solutions.

EXAMPLE 4

Example 4 demonstrated the effectiveness of centrifugation in separating the adsorbent-catalyst residue from the treated polymer solutions. A polymer solution was prepared by dissolving a hydrogenated styrene-butadiene-styrene block copolymer in cyclohexane to form an 8 percent by weight solution. The block copolymer has 29 percent by weight styrene and had a molecular weight of about 52,000. Nickel hydrogenation catalyst was added to the polymer solution to a level of about 117 ppm. The hydrogenation catalyst had been prepared by reacting nickel 2-ethyl-1-hexanoate with triethyl aluminum. About 2340 grams of the solution was placed in a 4 liter reactor and held at 25° C. Manville's R-685 magnesium silicate adsorbent (15.85 g) was then added to the reactor. The solution was agitated at a slow rate for 2 hours. The agitation rate was then increased and continued for an additional hour. Two samples were taken every 30 minutes. One sample was centrifuged for 5 minutes to remove the adsorbent containing the adsorbed nickel and the second sample was centrifuged for 10 minutes. Conditions of the centrifuge modeled commercially available centrifuges. The nickel residuals of the centrifuged solutions were then determined. Table 3 summarizes the nickel contents of the polymer solutions prepared in this example along with contact times and centrifugation times. The nickel concentrations from Table 3 indicates that the nickel was adsorbed on the magnesium silicate, and removed by centrifugation such that less than 5 ppm nickel remained in the solutions after 30 minutes adsorbent/solution contact time and 5 minutes centrifugation time:

TABLE 3

| Contact Time (min) | Centrifugation Time (min) | Nickel (ppm, solution basis) |
| --- | --- | --- |
| 30 | 5 | 1.33 |
| 30 | 10 | 0.28 |
| 60 | 5 | 1.15 |
| 60 | 10 | 0.13 |
| 90 | 5 | 0.23 |
| 90 | 10 | 0.05 |
| 120 | 5 | 0.45 |
| 120 | 10 | 0.05 |
| 180 | 5 | 0.08 |
| 180 | 10 | None Detected |

We claim:
1. A process comprising the steps of:
   (a) contacting a Group VIII metal hydrogenation catalyst residue containing polymer solution with a silicate in powder or small bead form to adsorb the residue from the solution; and
   (b) recovering a polymer solution comprising less than 5 ppm by weight, based on the solution, of the hydrogenation catalyst residue metals.
2. The process of claim 1 wherein the hydrogenation catalyst was prepared by combining a Group VIII metal carboxylate or alkoxide with an alkyl or hydride of a metal selected from Groups I-A, II-A and III-B of Medeleev's Periodic Table of Elements.
3. The process of claim 1 wherein the hydrogenation catalyst is prepared by combining a component selected from the group comprising nickel carboxylate, nickel alkoxide, cobalt carboxylate, iron alkoxide, palladium carboxylate and palladium alkoxide with a component selected from the group consisting of lithium alkyl, lithium hydride, magnesium alkyl, magnesium hydride, aluminum alkyl and aluminum hydride.
4. The process of claim 1 wherein the hydrogenation catalyst is prepared by combining nickel 2-ethylhexanoate and an aluminum alkyl.
5. The process of claim 4 wherein the aluminum alkyl is triethylaluminum.
6. The process of claim 1 wherein the silicate is selected from the group consisting of calcium silicate, magnesium silicate and diatomaceous earth.
7. The process of claim 1 wherein the silicate has an average diameter of less than about 0.5 mm.
8. The process of claim 1 wherein the chelating resin is selected from the group consisting of Micro-Cel T-49, Silasorb, Celite and Hyflow SuperCel.
9. The process of claim 1 wherein the hydrogenation catalyst residue is in the form of a colloidal suspension.
10. The process of claim 1 wherein the polymer solution comprises from about 1 to about 40 percent by weight polymer based on the total polymer solution, in an inert solvent.
11. The process of claim 10 wherein the inert solvent is selected from the group comprising cyclohexane, toluene, hexane, diethyl ether and benzene.
12. The process of claim 1 wherein the polymer is a hydrogenated polymer comprising conjugated diolefin monomer units.
13. The process of claim 12 wherein the polymer is a copolymer comprising monomer units of a conjugated diolefin and styrene.
14. The process of claim 13 wherein the copolymer is a block copolymer comprising at least one block which comprises monomer units of conjugated diolefins and at least one block which comprises styrene monomer units.
15. The process of claim 10 wherein the polymer is anionically polymerized in the inert solvent prior to hydrogenation of the polymer.
16. The process of claim 1 further comprising the step of contacting the hydrogenation catalyst residue containing polymer solution with an oxidation agent before the polymer solution is contacted with the silicate.
17. The process of claim 16 wherein the oxidation agent is molecular oxygen.
18. The process of claim 17 wherein the molecular oxygen is contacted with the hydrogenation catalyst residue containing polymer solution by sparging a gas stream comprising oxygen through the polymer solution.
19. The process of claim 18 wherein the gas stream comprises a major portion of nitrogen and a minor portion of oxygen.
20. The process of claim 18 wherein the gas is air.
21. The process of claim 16 wherein the oxidation agent is a peroxide.
22. The process of claim 1 wherein an oxidizing agent is contacted with the catalyst residue containing polymer solution when the polymer solution is contacting the silicate.
23. The process of claim 22 wherein the oxidizing agent is a peroxide.
24. The process of claim 1 wherein the polymer solution comprising less than 5 ppm of the Group VIII metal is recovered by filtration of solids from the solution.
25. The process of claim 24 wherein the filtration is performed utilizing a filter aid.

26. The process of claim 1 wherein the polymer solution comprising less than 5 ppm of the Group VIII metal is recovered by gravity settlement of solids from the solution.

27. The process of claim 1 wherein the polymer solution comprising less than 5 ppm of the Group VIII metal is recovered by centrifugation of solids from the solution.

28. The process of claim 1 wherein the silicate and the catalyst residue containing polymer solution are contacted while the solution is being agitated.

29. The process of claim 28 wherein the silicate and the catalyst residue containing polymer solution are contacted and separated in two or more stages.

30. The process of claim 29 wherein the stages are countercurrent stages.

31. The process of claim 29 wherein the silicate is selected from the group consisting of calcium silicate, magnesium silicate and diatomaceous earth.

32. The process of claim 1 wherein the catalyst residue containing polymer solution and the silicate are contacted in a fixed bed of porous silicate.

33. The process of claim 32 wherein the silicate is diatomaceous earth.

* * * * *